United States Patent
Isaac et al.

(10) Patent No.: US 8,732,360 B2
(45) Date of Patent: May 20, 2014

(54) SYSTEM AND METHOD FOR ACCESSING MEMORY

(75) Inventors: Roger Dwain Isaac, Campbell, CA (US); Seiji Miura, Tokyo (JP)

(73) Assignee: Spansion LLC, Sunnyvale, CA (US)

(*) Notice: Subject to any disclaimer, the term of this patent is extended or adjusted under 35 U.S.C. 154(b) by 450 days.

(21) Appl. No.: 12/276,010

(22) Filed: Nov. 21, 2008

(65) Prior Publication Data

US 2009/0138597 A1 May 28, 2009

Related U.S. Application Data

(60) Provisional application No. 61/004,434, filed on Nov. 26, 2007, provisional application No. 61/004,362, filed on Nov. 26, 2007, provisional application No. 61/004,412, filed on Nov. 26, 2007, provisional application No. 61/004,361, filed on Nov. 26, 2007.

(51) Int. Cl.
*G06F 13/16* (2006.01)

(52) U.S. Cl.
USPC .................................. 710/56; 710/19; 710/52

(58) Field of Classification Search
CPC combination set(s) only.
See application file for complete search history.

(56) References Cited

U.S. PATENT DOCUMENTS

| | | | | |
|---|---|---|---|---|
| 6,820,181 | B2 * | 11/2004 | Jeddeloh et al. | 711/169 |
| 7,200,137 | B2 * | 4/2007 | Dorr et al. | 370/351 |
| 7,512,762 | B2 * | 3/2009 | Gower et al. | 711/167 |
| 2004/0024948 | A1 | 2/2004 | Winkler et al. | |
| 2004/0139286 | A1 | 7/2004 | Lin et al. | |
| 2004/0243769 | A1 * | 12/2004 | Frame et al. | 711/148 |
| 2005/0086441 | A1 | 4/2005 | Meyer et al. | |
| 2005/0149774 | A1 | 7/2005 | Jeddeloh et al. | |
| 2005/0172084 | A1 * | 8/2005 | Jeddeloh | 711/154 |
| 2005/0177677 | A1 | 8/2005 | Jeddeloh | |
| 2006/0015699 | A1 * | 1/2006 | Fujiwara et al. | 711/162 |
| 2006/0095701 | A1 | 5/2006 | Gower et al. | |
| 2006/0179262 | A1 | 8/2006 | Brittain et al. | |
| 2007/0083701 | A1 * | 4/2007 | Kapil | 711/106 |

FOREIGN PATENT DOCUMENTS

| | | |
|---|---|---|
| JP | 2007-526559 A | 9/2007 |
| WO | WO2007-002546 A2 | 4/2007 |
| WO | WO2007-060250 A1 | 5/2007 |

\* cited by examiner

*Primary Examiner* — Ilwoo Park

(57) ABSTRACT

A storage system and method for storing information in memory nodes. The storage or memory nodes include a communication buffer. Flow of information to the storage nodes is controlled based upon constraints on the communication buffer. In one embodiment, communications between a master controller and a storage node have a determined maximum latency.

15 Claims, 3 Drawing Sheets

SYSTEM AND METHOD FOR ACCESSING MEMORY

RELATED U.S. APPLICATIONS

This Application claims the benefit of and priority to the following Provisional Applications:

U.S. Provisional Application No. 61/004,434, filed Nov. 26, 2007, by Miura et al., entitled "A STORAGE SYSTEM AND METHOD", U.S. Provisional Application No. 61/004,362, filed Nov. 26, 2007, by Miura et al., entitled "A SYSTEM AND METHOD FOR ACCESSING MEMORY,", U.S. Provisional Application No. 61/004,412, filed Nov. 26, 2007, by Miura et al., entitled "A METHOD FOR SETTING PARAMETERS AND DETERMINING LATENCY IN A CHAINED DEVICE SYSTEM", and U.S. Provisional Application No. 61/004,361, filed Nov. 26, 2007, by Miura et al., entitled "SYSTEMS AND METHODS FOR READ DATA BUFFERING", which are incorporated herein by this reference.

This Application is also related to the following co-pending Applications:

U.S. application Ser. No. 12/276,143, by Miura et al., entitled "STORAGE SYSTEM AND METHOD," filed on Nov. 21, 2008, U.S. application Ser No. 12/276,061, by Miura et al., entitled "A METHOD FOR SETTING PARAMETERS AND DETERMINING LATENCY IN A CHAINED DEVICE SYSTEM" filed on Nov. 21, 2008, and U.S. application Ser. No. 12/276,116, by Miura et al., entitled "SYSTEMS AND METHODS FOR READ DATA BUFFERING", filed on Nov. 21, 2008, which are incorporated herein by this reference.

FIELD OF THE INVENTION

The present invention relates to the field of node management. More particularly, the present invention relates to an efficient and effective system and method for accessing memory node resources.

BACKGROUND OF THE INVENTION

Electronic systems and circuits have made a significant contribution towards the advancement of modem society and are utilized in a number of applications to achieve advantageous results. Electronic technologies such as digital computers, calculators, audio devices, video equipment, and telephone systems have facilitated increased productivity and reduced costs in analyzing and communicating data, ideas and trends in most areas of business, science, education and entertainment. Frequently, the electronic systems designed to provide these results include memories (e.g., low power double data rate (LPDDR) memory, MemLink, synchronous dynamic random access memory, NOR flash memory, NAND Flash memory and the like). However, accessing memory resources in a fast and efficient manner can involve complicated protocols.

Numerous electronic devices include processors that operate by executing software comprising a series of instructions for manipulating data in the performance of useful tasks. The instructions and associated data are typically stored in a memory. Memories usually consist of a location for storing information and a unique indicator or address. The utility a device provides often depends upon the speed and efficiency at which instructions are executed. The ability to access a memory and transfer information quickly and conveniently usually has a significant impact on information processing latency. The configuration of a memory usually affects the speed at which memory locations are accessed.

Traditional attempts at memory control are often very convoluted and complex. Conventional systems that utilize tokens usually introduce a number of inefficiencies. For example, token approaches often create inefficiency and overhead with regards to the number of buffers in the system and often result in more buffers being made available than what is actually necessary for a link to function. Token approaches can also create inefficiencies with regards to latency and available bandwidth. The token approach can also lead to other scheduling issues. A controller may want to schedule a request but has no idea or way of knowing how long the request is going to take in the system because the controller doesn't know the traffic patterns going downstream. A storage node could have run out of buffers for a number of reasons, such as the node could be backed up, a request is stuck at the node, and the system can become non optimal and non deterministic.

SUMMARY OF THE INVENTION

A storage system and method for storing information in memory nodes are presented. The storage or memory nodes include a communication buffer. Flow of information to the storage nodes is controlled based upon constraints on the communication buffer. In one embodiment, communications between a master controller and a storage node have a determined maximum latency.

The system and method of the present invention facilitates efficient and convenient memory access. The memory access can be performed without information packets unlike traditional networks, such as networks that use tokens. The present invention further facilities minimal redesign of current components. For example, a feature to keep count of available buffers for the nearest storage node. Embodiments of the present invention can be utilized to provide efficient and effective control of memory nodes organized in a chain configuration or network.

DETAILED DESCRIPTION OF THE INVENTION

Figure 1:
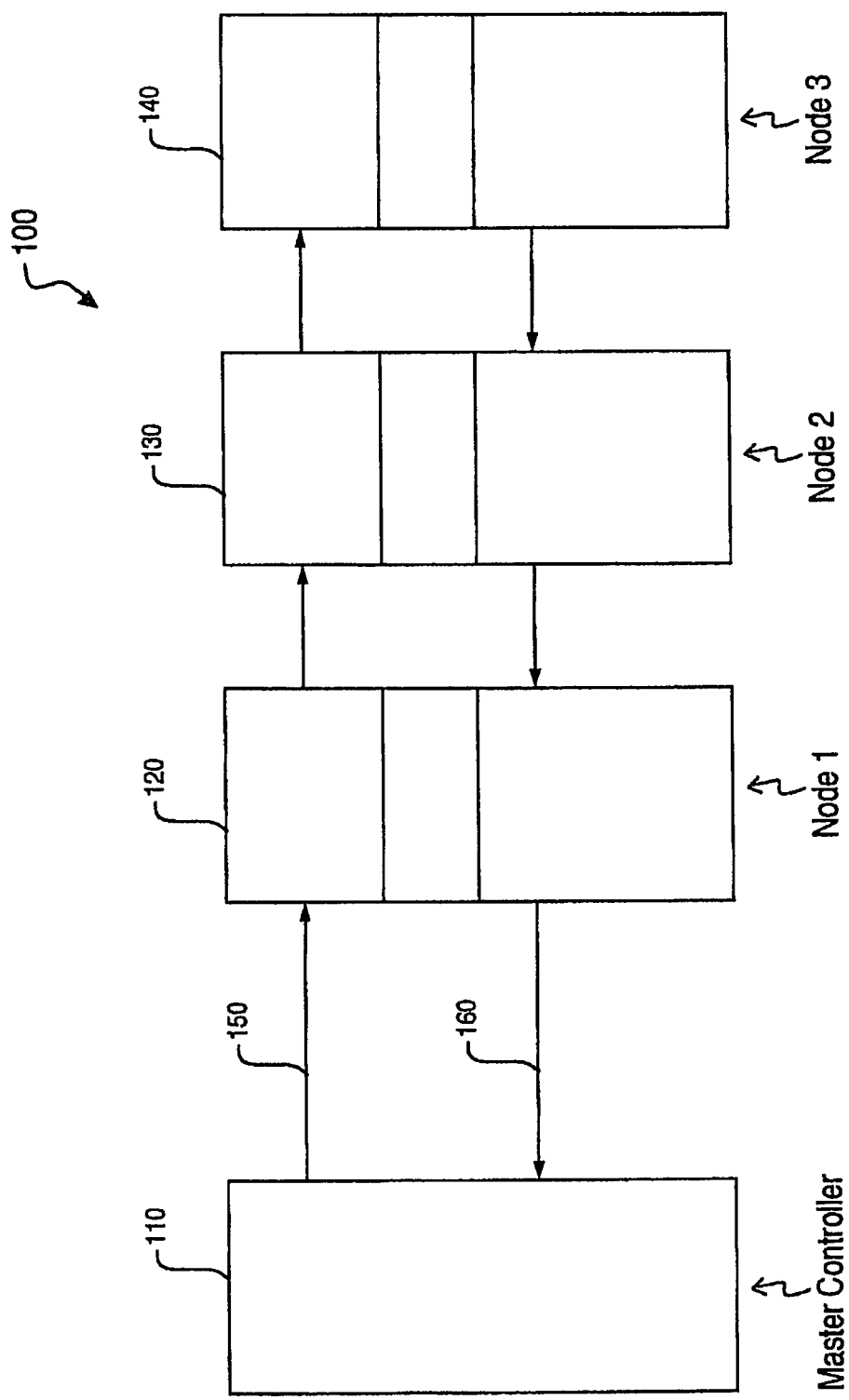
FIG. 1 is a block diagram of a storage system in accordance with one embodiment of the present invention.

Reference will now be made in detail to the preferred embodiments of the invention, a semiconductor isolation material deposition system and method, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

FIG. 1 is a block diagram of storage system 100 in accordance in one embodiment of the present invention. Storage system 100 facilitates efficient and convenient storage of data. In one embodiment, storage system 100 comprises storage nodes 120, 130, and 140, and a master controller 110. Storage nodes 120, 130, and 140, are coupled in a chain configuration to master controller 110. Each storage node has a number of resources available for facilitating handling of memory requests or commands and the master controller 110 maintains information on the distribution of resources within the chain or network and how traffic flows through the network. In one embodiment, master controller 110 performs a number of access request scheduling operations. Advantageously, information packets are not required to be exchanged. Further, communication protocol tokens are not utilized for scheduling requests to the plurality of memory nodes.

It is appreciated the present invention is readily adaptable to a variety of storage node implementations. In one exemplary implementation the storage nodes are organized in a chain configuration or network.

The components of storage system 100 cooperatively operate to provide convenient storage of information. Storage nodes 120, 130, and 140 store information. Master controller 110 communicates with the storage nodes or memory devices via downstream bus 150 and upstream bus 160. Master controller 110 further has a counter corresponding to the number of storage buffers in each node and each counter starts out with the number of buffers within the corresponding storage node. In one embodiment, each storage node in the chain has the same number of buffers and thereby master controller initiates each of the counters with the same number.

Master controller 110 forwards both requests that do require responses and requests that do not require responses to the plurality of memory nodes according to individual characteristics of the plurality of memory nodes.

In one embodiment, downstream bus 150 is used to send memory requests or commands including, but not limited to, refresh, read, write, mode register operations (e.g., read and write), reset, etc. Master controller 110 receives responses to the memory requests or commands via upstream bus 160. When the requests do not require responses, master controller 110 sends the requests down the chain according to the individual characteristics of each of the devices within the chain.

In one exemplary embodiment, master controller 110 forwards requests that require responses to the plurality of memory nodes according to a count of buffers (or space) available in at least one of the plurality of memory nodes. Master controller 110 decrements the internal counter corresponding to the target storage node or device upon forwarding each command or request that requires a response (e.g., memory read). Once the counter reaches zero, master controller 110 sends no more requests because there are no buffers available. Once a response is received (e.g., via upstream bus 160) by master controller 110, master controller 110 increments the counter associated with that storage node or device. Master controller 110 may then send a memory request to the storage node or device from which a response was received because the device has a buffer available. For example, a response to a memory read may be received by master controller 110 from storage node 120, master controller 110 then increments the counter corresponding to storage node 120 and master controller 110 can now send a memory to storage node 120.

In one embodiment, the storage nodes include a communication buffer for receiving commands from master controller 110. Master controller 110 controls flow to the first storage node based upon constraints of the communication buffer. In one exemplary implementation, the communication between the master controller and the last or farthest storage node in the chain has a determined maximum latency.

In one embodiment, master controller 110 maintains only the state buffer count for the nearest memory (e.g., storage node 120) node connected within the chain. By the nature of the chain, master controller 110 can ensure that buffer utilization of the nearest node (e.g., storage node 120) is greater than or equal to the buffer utilization of the next nearest node (e.g., storage node 130) which is greater than or equal to the next nearest node (e.g., storage node 140). Thus, master controller 110 only need track the buffer utilization or count of the first or nearest storage node for the whole chain.

The optimal buffer size can be calculated by multiplying the maximal bandwidth of the link between master controller 110 and the first memory node (e.g., memory node 120) by the latency from master controller 110 to the farthest memory node or device in the chain (e.g., storage node 140). For example, if the maximal bandwidth is 1 GB/s and the latency of storage node 140 is 80 ns, the buffer size needed to ensure maximal bandwidth will be 80 Bytes.

Figure 2:
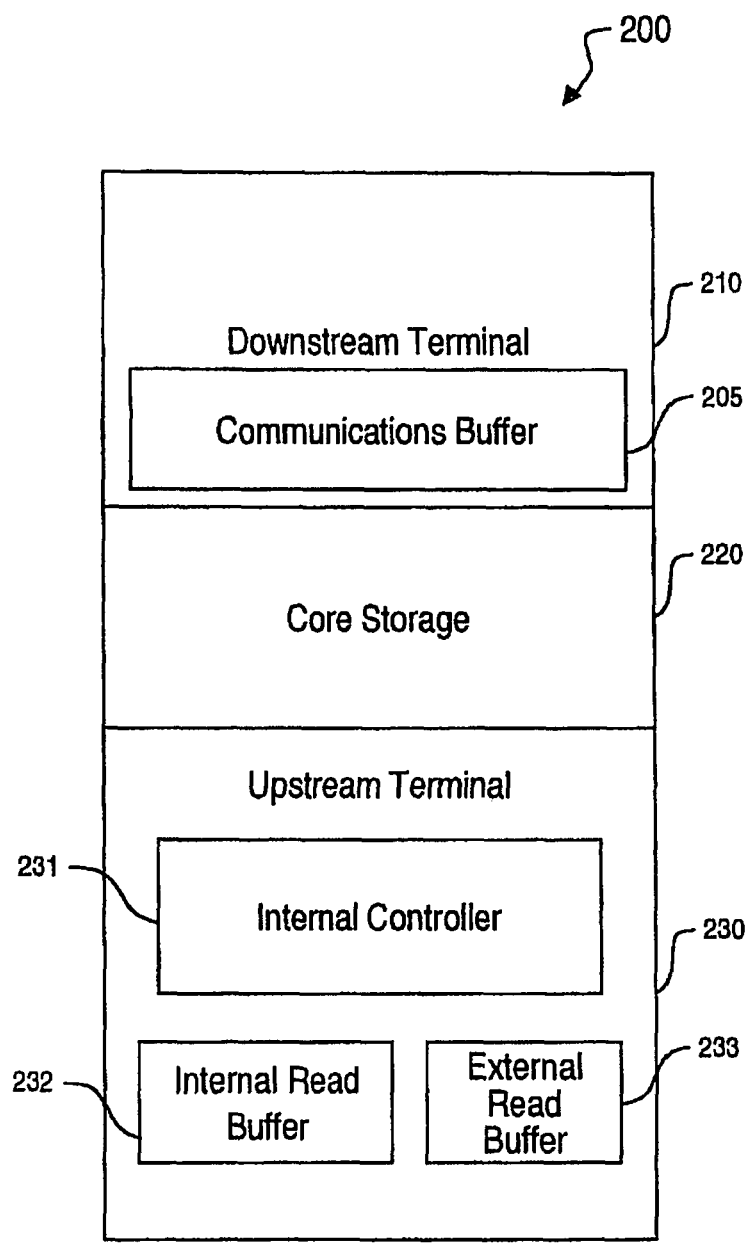
FIG. 2 is a block diagram of a storage node in accordance with one embodiment of the present invention.

FIG. 2 is a block diagram of a storage node 200 in accordance with one embodiment of the present invention. Storage node 200 facilitates storage and access of data. In one embodiment, storage node 200 comprises downstream terminal or request interface 210, core storage 220, upstream terminal or response interface 230.

In one embodiment, request interface 210 comprises communication buffer 205. Communication buffer 205 contains a plurality of buffers for storing and facilitating handling of memory requests or commands which may be received from a memory controller (e.g., master controller 110). In one exemplary implementation, a memory controller maintains a counter corresponding the number of buffers within communication buffer 205. As memory requests are received by request interface 210, the requests may be stored in the plurality of buffers within the communication buffer 205 and carried out via access to core storage 220. Request interface 210 may further forward requests to a next memory node or forward the request to core storage 220 to be serviced.

In one embodiment, core storage 220 is implemented as a memory. In one embodiment, core storage 220 is flash memory organized in a bit-line and word-line configuration. Completed requests serviced via core storage 220 are forwarded to response interface 230.

In one embodiment, request interface 230 comprises internal controller 231, internal read buffer 232, and external read buffer 233. Internal controller 231 controls whether data from the internal read buffer 232 or external read buffer 233 is sent out from response interface 230 upstream along a storage chain. It is appreciated that additional storage nodes and/or a master controller may be upstream. Internal controller 231 may give priority to data received from down stream memory devices to be sent upstream from response interface 230. When response interface 230 is receiving data from downstream memory devices, responses from core storage 220 are stored in internal read buffer 232 by internal controller 231. Thus, downstream request responses are given priority over local request responses.

When no data is being received from down stream memory devices, internal controller 231 will forward data from internal read buffer 232 upstream. If internal read buffer 232 is empty then responses to memory requests serviced by core storage 220 may be sent directly upstream without being stored in internal read buffer 232. During the sending of data upstream from internal read buffer 232 or directly from core storage 220, internal controller 231 stores data received from down stream devices in external read buffer 233. Upon completion of sending data from internal read buffer 232, internal controller 231 will start transferring data from external read buffer 233 and when external read buffer 233 is empty, requests from downstream devices will be sent upstream.

Figure 3:
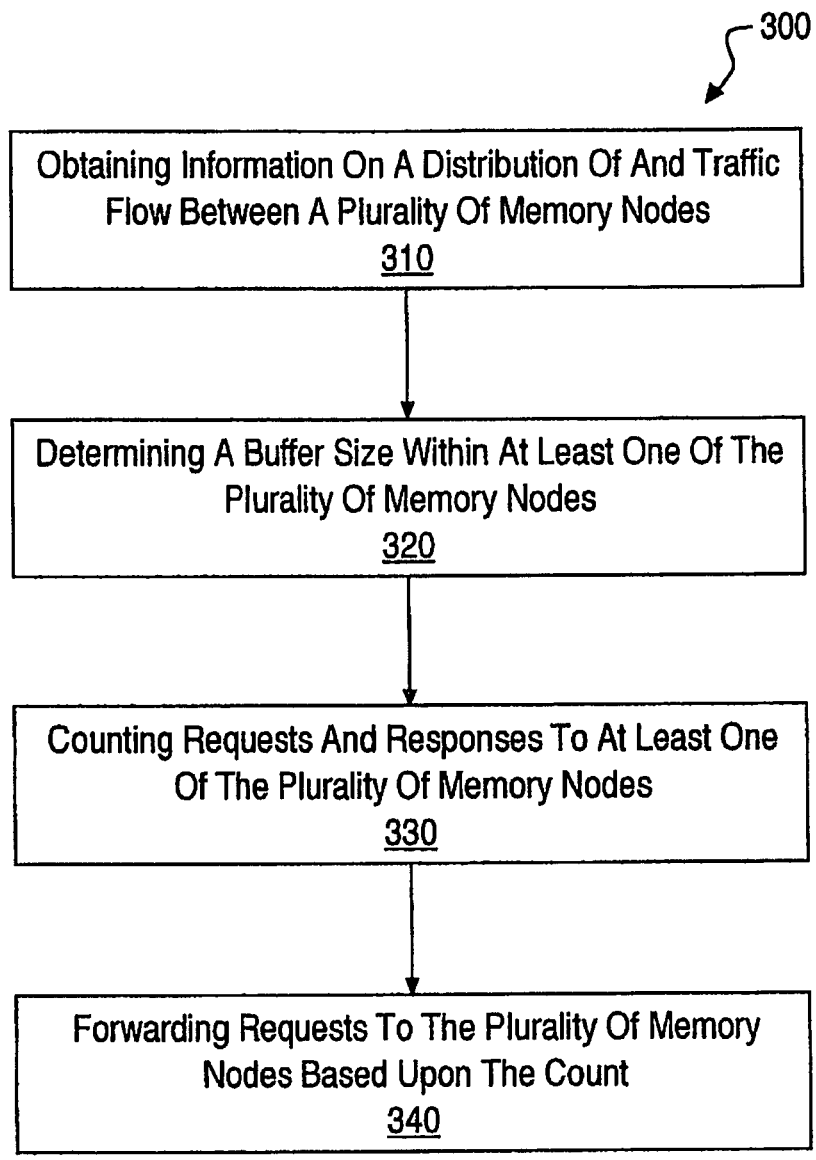
FIG. 3 is a flow chart of an exemplary storage method in accordance with one embodiment of the present invention

FIG. 3 is a flowchart of an exemplary a storage method 300 in accordance with one embodiment of the present invention. It is appreciated that flowchart 300 may be carried out by a storage system (e.g., storage system 100).

In block 310, information is obtained on a distribution of and traffic flow between a plurality of memory nodes. The information may be obtained by a master controller (e.g., master controller 110). In one embodiment, the information on the distribution indicates the plurality of memory nodes (e.g., storage nodes 120-140) are organized in a chain configuration.

In block 320, a buffer size within at least one of the plurality of memory nodes is determined. In one embodiment, the buffer size is determined for one of the plurality of the memory nodes (e.g., storage node 120) that is closest to a master controller (e.g., master controller 110). In one embodiment, determining a buffer size is ascertained by examining the nature of a bus topology coupling the plurality of memory nodes.

In block 330, requests and responses to at least one of the plurality of memory nodes are counted. The requests and responses may be counted by a master controller (e.g., master controller 110). In one exemplary embodiment, a counter is used corresponding to the number of buffers in each storage node. When a request is sent out the counter is decremented and the counter is incremented when a response from the corresponding storage node is received. In one embodiment, the requests and responses are counted for one of the plurality of the memory nodes (e.g., storage node 120) that is closest to a master controller.

In block 340, requests are forwarded to the plurality of memory nodes based upon the count. In one embodiment, if the counter corresponding to a specific memory node is zero, then no requests are sent to the memory node. If the counter corresponding to a storage node is greater than zero, requests are forwarded to the storage node. In one exemplary embodiment, a first one of the plurality of the memory nodes that is closest to a master controller is utilized the same as or more than other of the plurality of memory nodes.

Thus, a system and method of the present invention facilitates efficient and convenient memory access. The memory access can be performed without information packets unlike traditional networks, such as networks that use tokens. The present invention further facilities minimal redesign of current components. For example, a feature to keep of the count of available buffers for the nearest storage node. Embodiments of the present invention can be utilized to provide efficient and effective control of memory nodes organized in a chain configuration or network.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A storage system comprising:
    a first storage node for storing information wherein said first storage node includes a communication buffer;
    a master controller for controlling flow to said first storage node based upon constraints of said communication buffer, wherein communication between said master controller and said storage node has a determined maximum latency;
    wherein said master controller tracks a state of a buffer count of said first storage node by decrementing said buffer count when a request that involves a response is forwarded to said first memory node and incrementing said buffer count when a request response is received from said first memory node,
    further wherein a size of a communication buffer is determined by multiplying the maximal bandwidth between said master controller and a nearest storage node by the latency from said master controller to a farthest storage node, and
    further wherein said master controller is configured to forward a request that does not require a response to the first storage node according to the individual characteristics of said first storage node.

2. The storage system of claim 1 wherein said first storage node has the same number of buffers as a second storage node.

3. The storage system of claim 1 wherein utilization of said first storage node is greater than utilization of a second storage node.

4. The storage system of claim 1 wherein said first storage node and a second storage node are organized in a chain configuration.

5. A storage method comprising:
   obtaining information on a distribution of and traffic flow between a plurality of memory nodes;
      determining a buffer size within at least one of said plurality of memory nodes by multiplying the maximal bandwidth between a master controller and a nearest storage node by the latency from said master controller to a farthest storage node, and;
   counting requests and responses to at least one of said plurality of memory nodes, wherein said counting comprises decrementing a buffer count corresponding to the number of buffers in a memory node of said plurality of memory nodes when a request is sent out; and
   forwarding requests to said plurality of memory nodes based upon said buffer count if said requests require a response, and forwarding requests to said plurality of memory nodes based on characteristics of said individual nodes when said requests do not require a response.

6. The storage method of claim 5 wherein said information on said distribution indicates said plurality of memory nodes are organized in a chain configuration.

7. The storage method of claim 6 wherein said buffer size is determined for one of said plurality of said memory nodes that is closest to a master controller.

8. The storage method of claim 6 wherein requests and responses are counted for one of said plurality of said memory nodes that is closest to a master controller.

9. The storage method of claim 6 wherein said determining a buffer size is ascertained by examining the nature of a bus topology coupling said plurality of memory nodes.

10. The storage method of claim 6 further comprising utilizing a first one of said plurality of said memory nodes that is closest to a master controller the same as or more than other of said plurality of memory nodes.

11. A storage system comprising:
   a plurality of storage nodes for storing information wherein said plurality of storage nodes are organized in a chained network and each of said plurality of storage node includes a respective communication buffer comprising a respective plurality of buffers; and
   a master controller for controlling a flow of requests requiring responses to said plurality of storage nodes based upon a respective count of said respective plurality of buffers within said plurality of storage nodes, and a flow of requests which do not require responses to said plurality of storage nodes based upon individual characteristics of said storage nodes, wherein communication between said master controller and said plurality storage nodes has a determined maximum latency,
   wherein a size a communication buffer is determined by multiplying the maximal bandwidth between said master controller and a nearest storage node by the latency from said master controller to a farthest storage node, and
   wherein said master controller is operable to track a state of a respective buffer count of said respective plurality of buffers by decrementing said respective buffer count when a request that involves a response is forwarded to a respective storage node and incrementing said buffer count when a request response is received from said respective storage node.

12. The storage system of claim 11 wherein said master controller has information on the distribution of said plurality of storage nodes within a network and how traffic flows within said chained network.

13. The storage system of claim 12 wherein said master controller forwards requests that require responses and said requests that require responses are forwarded to said plurality of memory nodes according to a count of buffer space available in at least one of said plurality of memory nodes.

14. The storage system of claim 12 wherein communication protocol tokens are not utilized for scheduling requests to said plurality of memory nodes.

15. The storage system of claim 11 wherein said master controller counts requests to and responses from at least one of said plurality of memory nodes in said network.

* * * * *